(12) United States Patent
Kobayashi

(10) Patent No.: US 6,672,964 B2
(45) Date of Patent: Jan. 6, 2004

(54) VIDEO GAME WITH READILY DISTINGUISHABLE CHARACTERS DISPLAYING THE CHARACTER'S LINE OF SIGHT

(75) Inventor: Masaki Kobayashi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 61 days.

(21) Appl. No.: 09/973,117

(22) Filed: Oct. 10, 2001

(65) Prior Publication Data
US 2003/0003999 A1 Jan. 2, 2003

(30) Foreign Application Priority Data
Jun. 29, 2001 (JP) .......................... 2001-199989

(51) Int. Cl.⁷ .......................... A63F 13/00; A63F 9/24; G06F 17/00; G06F 19/00
(52) U.S. Cl. .......................... 463/43; 345/114; 345/115; 345/349; 345/419; 345/427; 463/1; 463/8; 463/9
(58) Field of Search .................... 463/1–9, 40–43, 463/31; 345/419, 429, 349, 113, 114, 115

(56) References Cited

U.S. PATENT DOCUMENTS

| 4,738,451 | A | * | 4/1988 | Logg | 463/2 |
| 6,175,366 | B1 | * | 1/2001 | Watanabe et al. | 345/422 |
| 6,304,267 | B1 | * | 10/2001 | Sata | 345/427 |
| 6,475,084 | B2 | * | 11/2002 | Tanibuchi et al. | 463/3 |
| 6,500,065 | B1 | * | 12/2002 | Sato | 463/4 |
| 6,503,144 | B1 | * | 1/2003 | Rimoto et al. | 463/4 |

FOREIGN PATENT DOCUMENTS

JP 2000-279643 10/2000

OTHER PUBLICATIONS

English Language Abstract of JP 2000–279643.
The Official Guide Book of Dragon Quest IV, Illusive Land Volume 1, Woeld Section, Dated Apr. 9, 1999, along with partial English language translation of the marked–up areas.
English Language Abstract of JP 2000–279643.
The Official Guide Book of Dragon Quest IV, Illusive Land Volume 1, World Section, Dated Apr. 9, 1999, along with partial English language translation of the marked–up areas.

* cited by examiner

Primary Examiner—Teresa Walberg
Assistant Examiner—Robert Mendoza
(74) Attorney, Agent, or Firm—Greenblum & Bernstein, P.L.C.

(57) ABSTRACT

A video game wherein input of a candidate character intended to be the object of an action to be performed by a predetermined character is accepted in accordance with a control operation of a player. On the basis of position information pertaining to the characters, a direction is detected. In accordance with this direction, image-control is carried out so that a line of sight of the predetermined character points to the candidate character accepted as input. The input is accepted of an action to be performed by a predetermined character in accordance with a control operation of a player, the action accepted as input is distinguished. When the action has been executed, a direction is successively detected on the basis of position information on the predetermined character arising from internal processing and position information on a character to be the object of the action. In accordance with this direction and the distinguished action, image-control is performed so that the line of sight of the predetermined character and the line of sight of the character to be the object of the action assume a predetermined relationship.

12 Claims, 4 Drawing Sheets

VIDEO GAME WITH READILY DISTINGUISHABLE CHARACTERS DISPLAYING THE CHARACTER'S LINE OF SIGHT

CROSS-REFERENCE TO RELATED APPLICATION

The present disclosure relates to subject matter contained in Japanese Patent Application No. 2001-199989, filed on Jun. 29, 2001, the disclosure of which is expressly incorporated herein by reference in its entirety.

BACKGROUND OF THE INVENTION

1. Field of the Invention

This invention relates to a computer-readable recording medium with a video game program recorded thereon; a video game program; a video game processing method; and a video game processing apparatus, capable of displaying multiple characters including player characters and enemy characters on a screen and controlling actions of the displayed characters in accordance with control operations of a player.

2. Description of the Related Art

A genre of computer video game is known as a role-playing game (RPG). In an RPG, generally, a character performs a role in a game in place of a player, and by controlling this character (hereinafter, the player character) the player experiences a virtual adventure while causing a story involving the player character to unfold. In most cases, a character which opposes the player character (hereinafter, an enemy character) is provided in each of a number of set zones formed in a virtual space. The story is then caused to unfold by the player character proceeding from one zone to the next and fighting with and defeating enemy characters seeking to prevent the player character from achieving a certain objective in the story.

The player character is controlled by means of buttons on a keypad, a joystick or the like. In response to control operations performed on this keypad, the player character moves and carries out predetermined actions. In the course of the story, numerous events such as battle scenes are provided. In these events, the game proceeds on the basis of selection operations being carried out by the player.

Although in battle scenes of video games of related art, in many cases a player character and an enemy character fight one-on-one, video games have also been proposed that make the game more interesting by allowing a number of player characters and a number of enemy characters to fight. Also proposed are video games where multiple player characters and multiple enemy characters can fight in a predetermined order and it is possible, as necessary, to replace a player character taking part in a scene such as a battle.

However, in video games of the related art, there has been the problem that the greater the number of characters taking part in a battle, and the more complicated are the actions that the player characters perform, the more difficult it becomes to keep track of their state. In worst cases, it has sometimes happened that the player performs an erroneous control operation and a character does not carry out the action that the player intended. Thus, the enjoyability of the game is reduced. Additionally, in some video games, when selecting a character to be the object of an action to be performed by a player character, not only is the control operation monotonous, but there has been the problem that because there is no response from the character, the process lacks a sense of reality.

SUMMARY OF THE INVENTION

It is, therefore, a purpose of the present invention to provide a computer-readable recording medium with a video game program recorded thereon; a video game program; a video game processing method; and a video game processing apparatus, with which it is possible to exploit the particular characteristics of the video game to heighten its sense of reality and with which it is possible to understand easily which character is to be the purpose of an action of a player character.

To achieve this purpose and other purposes, a first aspect of the invention provides a computer-readable recording medium on which is recorded a video game program capable of displaying multiple characters including a player character and an enemy character on a screen and controlling actions of the displayed characters in accordance with control operations of a player, which program executes accepting an input to a computer of a candidate character intended to be the purpose of an action to be performed by a predetermined character in accordance with a control operation of a player. Further, the program performs image-control so that the line of sight of the predetermined character points to the candidate character accepted as input.

According to this first aspect, because the line of sight of a predetermined character to execute an action is controlled to point to a candidate character, a recording medium with a program can be provided with which a player can easily make out the candidate character and the enjoyability of the game can be maintained.

With this first aspect, also, there may be recorded on the recording medium a program for accepting a second input of a second action to be performed by the predetermined character in accordance with a control operation of a player. The program also distinguishes the second action accepted as the second input. The program further executes the second action accepted as the second input in accordance with a control operation of the player. Moreover, the program performs image-control in accordance with a distinguishing result obtained when distinguishing the second action so that the line of sight of the predetermined character and the line of sight of the candidate character assume a predetermined relationship. In this case, even in the execution of a predetermined action accepted as input, the relationship between the predetermined character and the candidate character can to some extent be understood and the enjoyability of the game can be maintained better. This is so because the line of sight of the predetermined character performing the action and the line of sight of the candidate character are controlled so that they assume a predetermined relationship.

A second aspect of the invention provides a computer-readable recording medium on which is recorded a video game program capable of displaying multiple display characters including a player character and an enemy character on a screen and controlling actions of the displayed characters in accordance with control operations of a player. The program accepts an input to a computer of an action to be performed by a predetermined character in accordance with a control operation of a player. The program further distinguishes the action accepted as the input when accepting the input. Moreover, the program executes the action accepted as input when accepting the input in accordance with a control action of a player and performing image-control in accordance with a distinguishing result obtained when distinguishing the action so that the line of sight of the predetermined character and the line of sight of a character to be the purpose of the action assume a predetermined relationship.

According to this second aspect, in the execution of a predetermined action, accepted as input, a recording medium can be provided with which the relationship between the predetermined character and the candidate character can, to some extent, be understood and the enjoyability of the game can be better maintained. This is so because the line of sight of the predetermined character performing the action and the line of sight of the candidate character are controlled so that they assume a predetermined relationship.

A third aspect of the invention provides a video game program capable of displaying multiple characters including a player character and an enemy character on a screen and controlling actions of the displayed characters in accordance with control operations of a player. The program accepts an input to a computer of a candidate character intended to be the purpose of an action to be performed by a predetermined character in accordance with a control operation of a player. The program further performs image-control so that the line of sight of the predetermined character points to the candidate character accepted as input in the when accepting input.

According to this third aspect, because the line of sight of a predetermined character to execute an action is controlled to point to a candidate character, a player can easily make out the candidate character and the enjoyability of the game can be maintained.

With this third aspect, the video game program may also accept a second input of a second action to be performed by the predetermined character in accordance with a control operation of a player. The program further distinguishes the second action accepted as the second input. The program, moreover, executes the second action accepted as the second input in accordance with a control operation of the player and performs image-control in accordance with a distinguishing result obtained when distinguishing the second action so that the line of sight of the predetermined character and the line of sight of the candidate character assume a predetermined relationship. In this case, even in the execution of a predetermined action accepted as a second input, the relationship between the predetermined character and the candidate character can, to some extent, be understood and the enjoyability of the game can be better maintained. This is so because the line of sight of the predetermined character performing the action and the line of sight of the candidate character are controlled so that they assume a predetermined relationship.

A fourth aspect of the invention provides a video game program capable of displaying multiple characters including a player character and an enemy character on a screen and controlling actions of the displayed characters in accordance with control operations of a player. The program accepts an input to a computer of an action to be performed by a predetermined character in accordance with a control operation of a player. The program further distinguishes the action accepted as input when accepting the input. The program, moreover, executes the action accepted as input when accepting the input in accordance with a control action of a player and performing image-control in accordance with a distinguishing result obtained when distinguishing the action so that the line of sight of the predetermined character and the line of sight of a character to be the purpose of the action assume a predetermined relationship.

According to this fourth aspect, in the execution of a predetermined action accepted as input, the relationship between the predetermined character and the candidate character can to some extent be understood and the enjoyability of the game can be better maintained. This is so because the line of sight of the predetermined character performing the action and the line of sight of the candidate character are controlled so that they assume a predetermined relationship.

A fifth aspect of the invention provides a video game processing method of a video game capable of displaying multiple display characters including a player character and an enemy character on a screen and controlling actions of the displayed characters in accordance with control operations of a player. The method includes accepting an input to a computer of a candidate character intended to be the purpose of an action to be performed by a predetermined character in accordance with a control operation of a player. The method further includes performing image-control so that the line of sight of the predetermined character points to the candidate character accepted as input when accepting input.

According to this fifth aspect, because the line of sight of a predetermined character to execute an action is controlled to point to a candidate character, a player can easily make out the candidate character and the enjoyability of the game can be maintained.

With this fifth aspect, the method may further include accepting a second input of a second action to be performed by the predetermined character in accordance with a control operation of a player. The method further includes distinguishing the second action accepted as input. The method, moreover, executes the second action accepted at the second input in accordance with a control operation of the player and performing image-control in accordance with a distinguishing result obtained when distinguishing the second action so that the line of sight of the predetermined character and the line of sight of the candidate character assume a predetermined relationship. In this case, even in the execution of the predetermined action accepted as the second input, the relationship between the predetermined character and the candidate character can to some extent be understood and the enjoyability of the game can be maintained better. This is so because the line of sight of the predetermined character performing the action and the line of sight of the candidate character are controlled so that they assume a predetermined relationship.

A sixth aspect of the invention provides a video game processing method of a video game capable of displaying multiple display characters including a player character and an enemy character on a screen and controlling actions of the displayed characters in accordance with control operations of a player. The method includes accepting an input to a computer of an action to be performed by a predetermined character in accordance with a control operation of a player. The method further includes distinguishing the action accepted as input when accepting input. The method, moreover includes executing the action accepted as input when accepting input in accordance with a control action of a player and performing image-control in accordance with a distinguishing result obtained when distinguishing the action so that the line of sight of the predetermined character and the line of sight of a character to be the purpose of the action assume a predetermined relationship.

According to this sixth aspect, in the execution of an input-accepted predetermined action accepted as input, the relationship between the predetermined character and the candidate character can to some extent be understood and the enjoyability of the game can be better maintained. This is so because the line of sight of the predetermined character performing the action and the line of sight of the candidate character are controlled so that they assume a predetermined relationship.

A seventh aspect of the invention provides a video game processing apparatus, including a storing system that stores a video game program capable of displaying multiple display characters including a player character and an enemy character on a screen and controlling actions of the displayed characters in accordance with control operations of a player. The apparatus further includes a computer for reading from the storing system and executing the program. The apparatus, moreover, includes a display apparatus for picture display, provided as an output system of the computer, wherein the computer, by executing the program, accepts the input of a candidate character intended to be the purpose of an action to be performed by a predetermined character. This is in accordance with a control operation of a player. The apparatus further performs image-control so that the line of sight of the predetermined character points to the candidate character accepted as input.

According to this seventh aspect, because the line of sight of a predetermined character to execute an action is controlled to point to a candidate character, a player can easily make out the candidate character and the enjoyability of the game can be maintained.

With this seventh aspect, preferably, the computer also accepts an input of an action to be performed by a predetermined character in accordance with a control operation of a player and distinguishes the action accepted as input and executes the action accepted as input in accordance with a control operation of the player and performs image-control in accordance with a result of distinguishing the action accepted as input. This is so that the line of sight of the predetermined character and the line of sight of the candidate character can assume a predetermined relationship. In this case, even in the execution of the predetermined action accepted as input, the relationship between the predetermined character and the candidate character can to some extent be understood and the enjoyability of the game can be maintained better. This is so because the line of sight of the predetermined character performing the action and the line of sight of the candidate character are controlled so that they assume a predetermined relationship.

An eighth aspect of the invention provides a video game apparatus, including a storing system that stores a video game program capable of displaying multiple display characters including a player character and an enemy character on a screen and controlling actions of the displayed characters in accordance with control operations of a player. The apparatus further includes a computer for reading from the storing system and executes the program. The apparatus, moreover, includes a display apparatus for picture display, provided as an output system of the computer, wherein the computer, by executing the program, accepts the input of an action to be performed by a predetermined character in accordance with a control operation of a player and distinguishes the action accepted as input and executes the action accepted as input in accordance with a control operation of the player and performs image-control in accordance with a result of distinguishing the action accepted as input so that the line of sight of the predetermined character and the line of sight of the candidate character assume a predetermined relationship.

With this eighth aspect, in the execution of a predetermined action accepted as input, the relationship between the predetermined character and the candidate character can to some extent be understood and the enjoyability of the game can be better maintained. This is so because the line of sight of the predetermined character performing the action and the line of sight of the candidate character are controlled so that they assume a predetermined relationship.

DETAILED DESCRIPTION OF THE PREFERRED EMBODIMENTS

Figure 1:
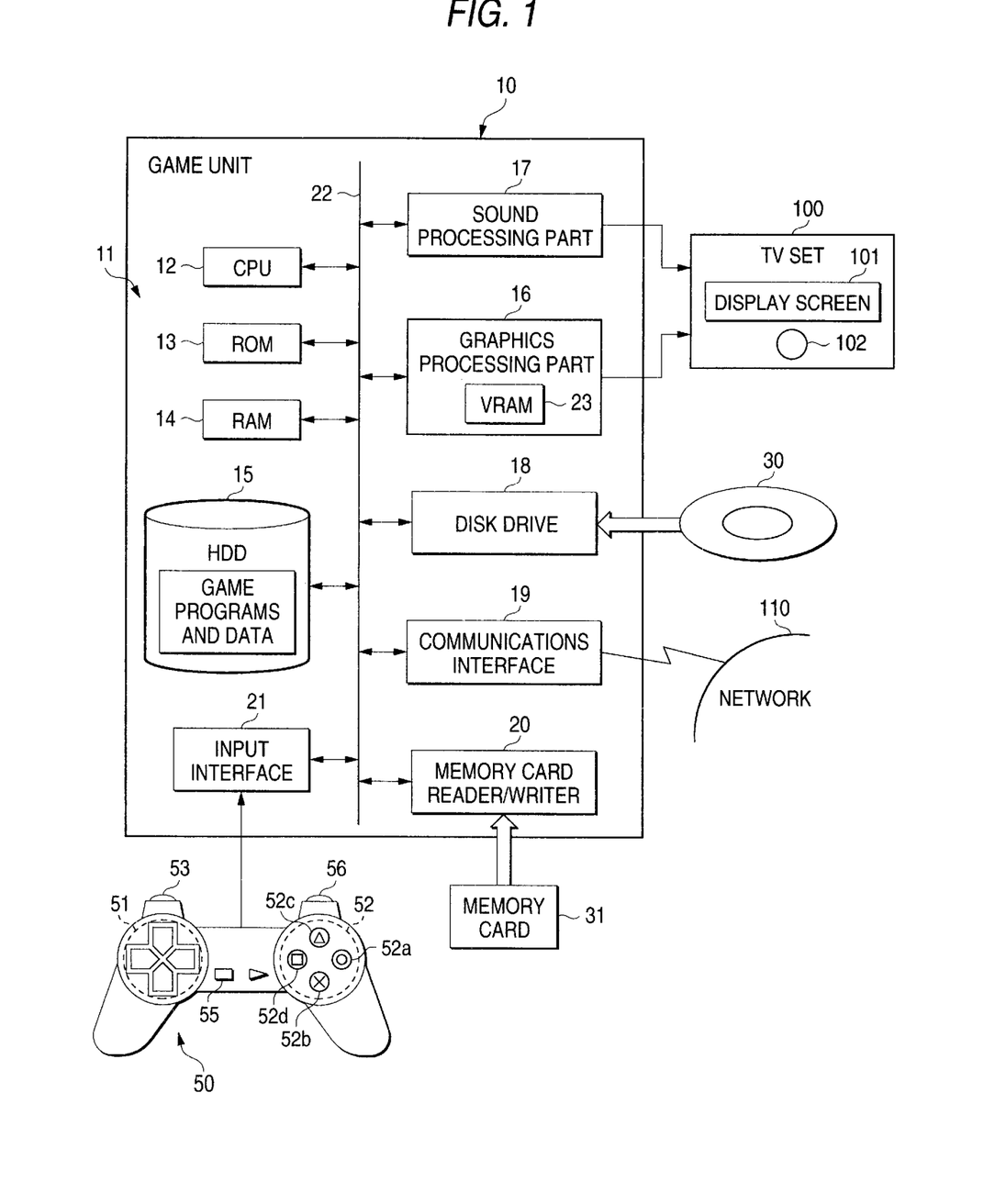
FIG. 1 is a block diagram showing an exemplary overall construction of a preferred embodiment of the invention.

A preferred embodiment of the invention is described with reference to the accompanying drawings. FIG. 1 is a block diagram showing the overall construction of this preferred embodiment.

First, a video game machine pertaining to this preferred embodiment of the invention is described. The game machine 10 is made up of a game unit proper 11 and a keypad 50 connected to an input side of the game unit proper 11, and a television set 100 having a CRT (Cathode Ray Tube) as a display unit, speakers and so on is connected to an output side of the game unit proper 11.

The game unit proper 11 has a CPU (Central Processing Unit) 12, a ROM (Read Only Memory) 13, a RAM (Random Access Memory) 14, a hard disc drive 15, a graphics processing part 16, an audio processing part 17, a disk drive 18, a communications interface 19, a memory card reader/writer 20, an input interface 21, and a bus 22 connecting these components together. The game unit proper 11 is connected via the input interface 21 to the keypad 50, which serves as a control input part.

A +-key 51 and a group of buttons 52 are provided on the top of the keypad 50. The button group 52 includes a O-button 52a, a ×-button 52b, a Δ-button 52c and a □-button 52d. A select button 55 is provided on a connecting part linking a base part on which the +-key 51 is provided to a base part on which the button group 52 is provided. Other buttons, such as an R1-button 56 and an L1-button 53, are provided on the side of the keypad 50.

The keypad 50 has switches linked respectively to the +-key 51, the O-button 52a, the ×-button 52b, the Δ-button 52c, the □-button 52d, the select button 55, the R1-button 56 and the L1-button 53. When a pushing force is applied to one of the buttons, the corresponding switch turns on. A detection signal corresponding to this on/off state of the switch is generated in the keypad 50.

The detection signals generated in the keypad 50 are supplied to the input interface 21, and by a detection signal from the keypad 50 being passed through the input interface 21 it becomes detection information indicating which button on the keypad 50 has been turned on. In this way, control operation commands keyed in to the keypad 50 by a user are supplied to the game unit proper 11.

The CPU 12 centrally controls the apparatus as a whole by executing an operating system stored in the ROM 13, and executes video game programs stored in a program area of the RAM 14. Also, the CPU 12 monitors the state of the keypad 50 by way of the input interface 21, executes video game programs stored in the program area of the RAM 14 as necessary, and as necessary stores in a predetermined area of the RAM 14 various data derived in the course of a game. The ROM 13 includes EEPROM (Electrically Erasable and Programmable Read Only Memory), and predetermined data in the RAM 14 which must be held even when the power supply is cut are stored in the EEPROM at a stage before power supply cut-off.

The RAM 14 essentially has a program area, a picture data area, and an audio data area, and also has an area for holding other data. Program data, picture data, audio data and other data read from a disc 30 such as a DVD or a CD-ROM by the disk drive 18 are respectively held in these areas.

The RAM 14 is also used as a work area, and various data derived in the course of the game are further held in the area for holding other data. Program data, picture data, audio data and other data read from the disc 30 can also be held in the hard disc drive 15; program data, picture data, audio data and other data held in the hard disc drive 15 may be transferred to the RAM 14 as necessary; and various data derived in the course of the game and held in the RAM 14 may be transferred to and held in the hard disc drive 15.

The graphics processing part 16 includes in a VRAM 23 a frame buffer which constitutes a buffer memory for holding picture data. Using control information from the CPU 12 arising along with program execution it generates a video signal on the basis of picture data held in the frame buffer and outputs the video signal to the television set 100. As a result, a picture based on picture data held in the frame buffer is displayed on the display screen 101 of the television set 100.

The audio processing part 17 has the function of generating audio signals such as BGM (Background Music), conversations between characters, and sound effects. The audio processing part 17 outputs to a speaker 102 of the television set 100 a sound signal including audio signals on the basis of data stored in the RAM 14 using control information from the CPU 12 arising along with program execution.

The television set 100 has the display screen 101 and the speaker 102 and performs picture (image) and audio output according to the content of the video game on the basis of the video signal (picture signal) and sound signal from the game unit proper 11.

The disk drive 18 is so constructed that the disc (DVD or CD-ROM) 30, which is a recording medium, can be removably loaded into it, and reads video game program data, picture data, audio data and other data held on the disc 30.

The communications interface 19 is connected to a network 110, and acquires various kinds of data by performing data communications with data storage devices and information processing devices such as servers installed in other locations. The video game program data, picture data, audio data and other data held in the RAM 14 may alternatively be acquired by way of a network 110 and the communications interface 19.

The memory card reader/writer 20 is so constructed that a memory card 31 can be removably loaded into it, and writes save data of a relatively low volume, such as mid-way progress data of video games and video game environment setting data, to a memory card.

On a recording medium pertaining to this preferred embodiment of the invention, that is, the disc 30, is recorded a video game program capable of displaying multiple characters including player characters and enemy characters on a screen and controlling actions of the displayed characters in accordance with control operations of a player, and this can be read by a computer (the CPU 12 and its peripheral devices). The computer can accept the input of a candidate character intended to be the object of an action to be performed by a predetermined character in accordance with control operations of the player. The computer also can perform image-control so that the line of sight of the predetermined character points to the candidate character input-accepted when accepting input.

The computer can also accept a second input of a second action to be performed by a predetermined character in accordance with control operations of a player; distinguish the second action accepted as the second input; and execute the second action accepted as the second input in accordance with control operations of the player and performing image-control in accordance with a distinguishing result obtained when distinguishing the second action so that the line of sight of the predetermined character and the line of sight of the candidate character assume a predetermined relationship.

Accordingly, the game unit proper 11 has, besides the functions necessary for carrying out a related art video game by software processing based on data held in the CPU 12 and the various memories, as special functions, a first function of accepting the input of a candidate character intended to be the object of an action to be performed by a predetermined character in accordance with control operations of the player, and further a function of performing image-control so that the line of sight of the predetermined character points to this input-accepted candidate character.

The game unit proper 11 also has a second function of accepting the input of an action to be performed by a predetermined character in accordance with control operations of a player; a function of distinguishing the action input-accepted by the second function; and a function of executing the action input-accepted by the second function in accordance with control operations of a player and performing image-control in accordance with the result of distinguishing the action so that the line of sight of the predetermined character and the line of sight of the candidate character assume a predetermined relationship.

As a result a video game can be realized with which it is possible to exploit the particular characteristics of the video game to raise its sense of reality and with which it is possible to understand easily which character is to be the object of an action of a player character. Instead of being realized by software processing, these functions may alternatively be realized by the provision of appropriate dedicated hardware.

Figure 2:
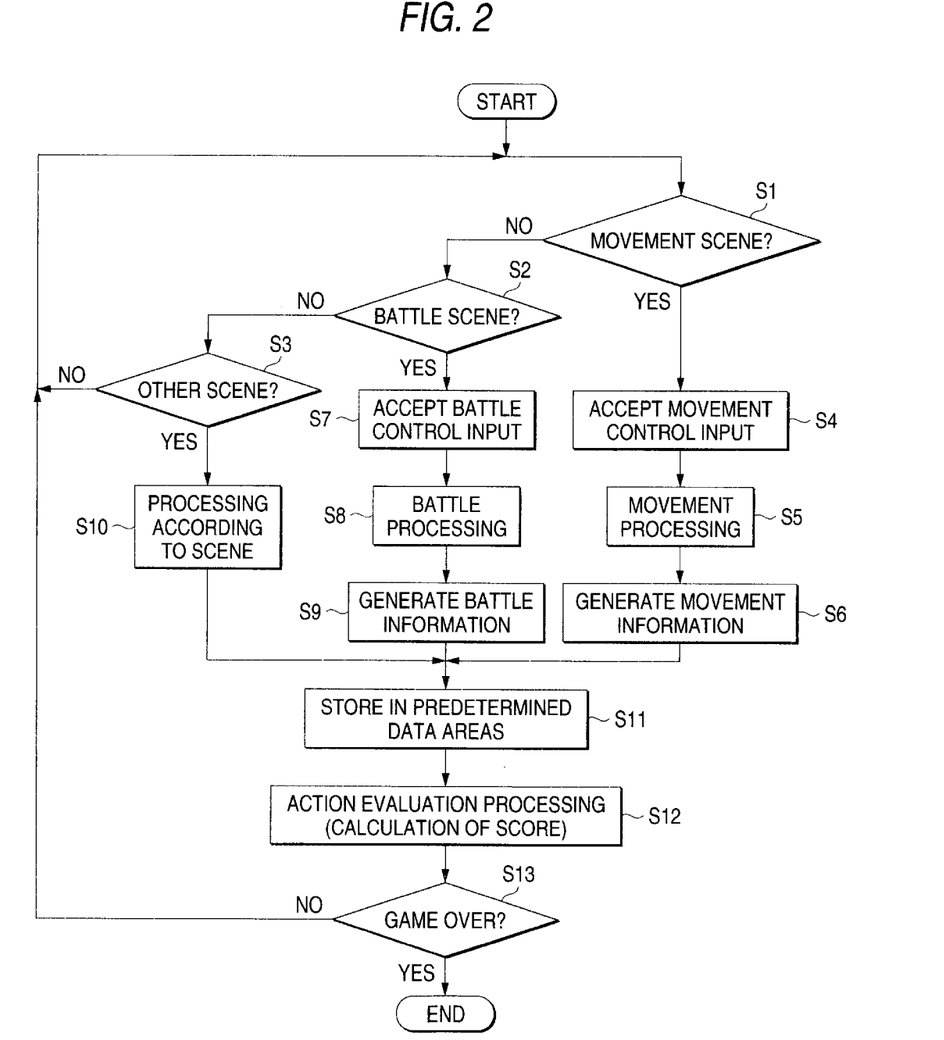
FIG. 2 is a flow chart used in an exemplary explanation of the overall operation of the invention.

Next, the operation of this preferred embodiment will be explained. FIG. 2 is a flow chart showing an example of a processing routine of the overall operation of the preferred embodiment described above. The steps in FIG. 2 have been assigned the reference numerals S1 through S13.

First, when a power supply (not shown) is turned on, a boot program is read out; the different parts are initialized; and processing for starting a game is carried out. That is, by the disk drive 18, video game program data, picture data, audio data and other data held in the disc (DVD or CD-ROM) 30 are read out and stored in the RAM 14, and as necessary, data held in nonvolatile memory such as the EEPROM of the ROM 13, the hard disc drive 15, or the memory card 31 are read out and stored in the RAM 14. Before the start of an actual game, various settings are carried out to reach a state from which a game can proceed. Then, when a game is started from this state, a scene such as a movement scene, a battle scene or some other scene is set, and processing proceeds to step S1.

In step S1 it is determined whether or not the present scene is a movement scene, and if it is not a movement scene processing proceeds to step S2 and determines whether or not it is a battle scene. When in step S2 it is determined that the scene is not a battle scene, processing moves on to step S3 and it is determined whether or not the scene is another scene (conversation, shopping or picking up). When in step S3 it is determined that the scene is not another scene, processing returns to step S1 and the processing of steps S1 through S3 is repeated so that a standby state is assumed.

When in this state it is determined in step S1 that the present scene is a movement scene, processing moves on to step S4 and a movement control input-accepting state is assumed. And in step S5, movement processing corresponding to an accepted movement control input is carried out. When the movement processing ends, processing moves on to step S6 and movement information is generated on the basis of player character position information derived successively along with the movement processing. The movement information includes information showing a set zone in a virtual space in which the present player character is positioned. When the movement information has been generated, processing moves on to step S11.

When in step S2 it is determined that the present scene is a battle scene, processing moves on to step S7 and a battle control input-accepting state is assumed. Then, in step S8, battle processing corresponding to input-accepted battle control operations is carried out; a battle is fought between multiple player characters and multiple enemy characters in a combination freely selected by the player; and processing proceeds to step S9. In step S9, battle information is generated which shows for example names of the player characters and enemy characters which fought; the progress of the battle; the result of the battle; and parameters stipulating the capabilities of the player characters. When the battle information has been generated, processing moves on to step S11.

When in step S3 it is determined that the present scene is some other scene (conversation, shopping, picking up or the like), the routine proceeds to step S10 and processing according to the scene is carried out; other information corresponding to that processing is generated; and the routine proceeds to step S11.

When processing reaches step S11, the present position of the player character is successively updated by movement information being stored in a predetermined data area of the RAM 14. And, along with that, battle zone information for each set zone and other information is stored in a predetermined data area of the RAM 14. That is, an action history of the player character is stored for each set zone.

Then, in step S12, action evaluation processing is carried out on the basis of the information showing the action history of the player character stored in the RAM 14. Specifically, for information of which numbering is necessary, numbering is carried out using a pre-prepared conversion table. For information of which weighting is necessary, predetermined coefficients are applied. These figures are totalled to calculate a score. The calculated score is added to a previous score held in a predetermined data area of the RAM 14, and by this being stored again in a predetermined data area of the RAM 14 a score constituting evaluation information is successively updated.

When action evaluation processing ends like this, processing moves on to step S13 and determines whether the game is over, and when the game is not over, processing returns to step S1 and the processing of step S1 through step S13 described above is repeated.

When in step S13 it is determined that the game is over, although this is not shown in FIG. 2, the information showing the action history of characters, the evaluation information, and the player character capability settings information held in a predetermined area of the RAM 14 are each read from the RAM 14 and transferred to and stored together with other data in rewritable nonvolatile memory such as the EEPROM of the ROM 13, the hard disc drive 15, or the memory card 31. After other kinds of processing accompanying the ending of a game are carried out, the power supply is cut off and the game ends. When the power supply is switched on again, the various information and other data thus held in nonvolatile memory by data save processing before power supply cut-off are read out from the nonvolatile memory to which they were saved and stored again in the same data area of the RAM 14 in which they were held before the power supply was cut off.

Figure 3:
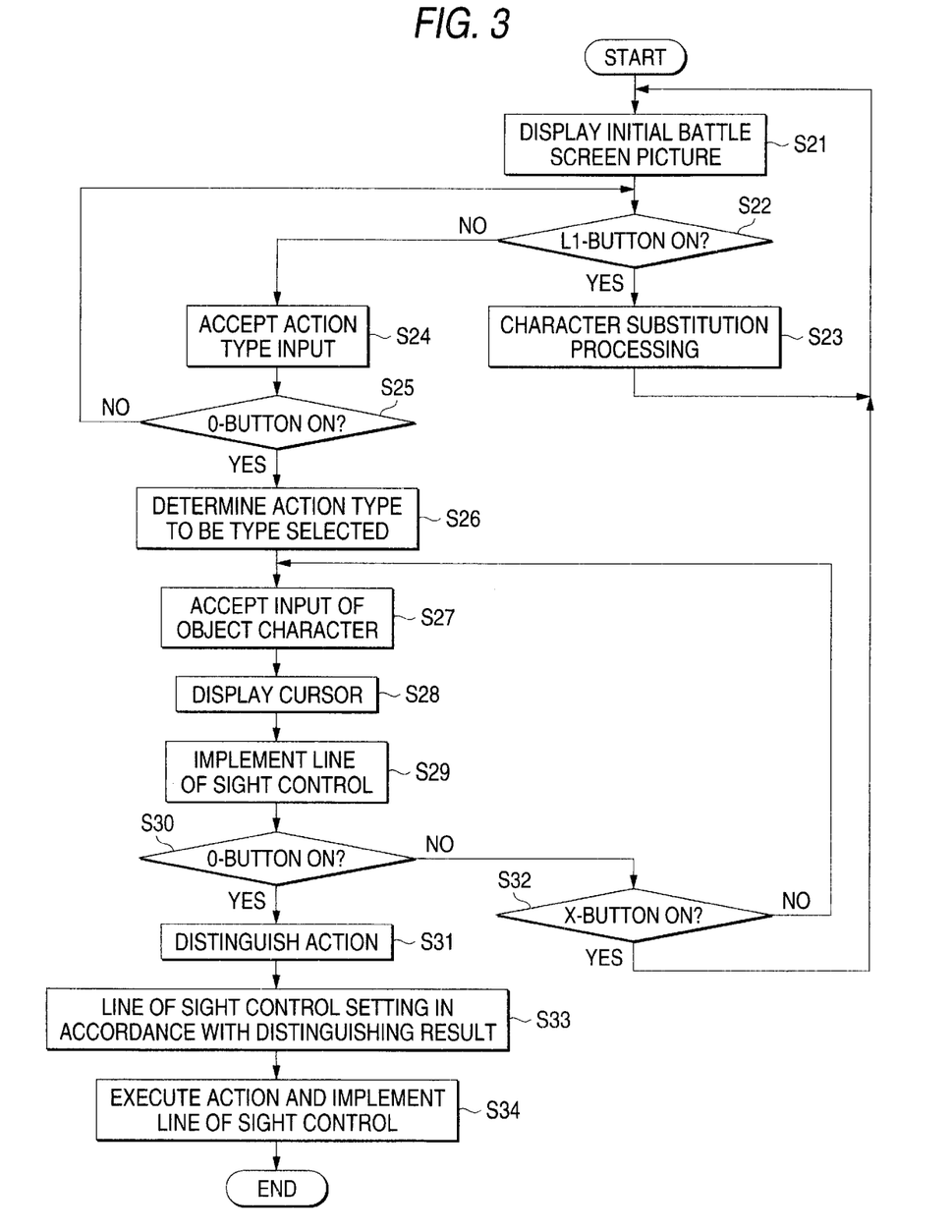
FIG. 3 is a flow chart used in an exemplary explanation of battle control input-acceptance processing invention.
Figure 4A:
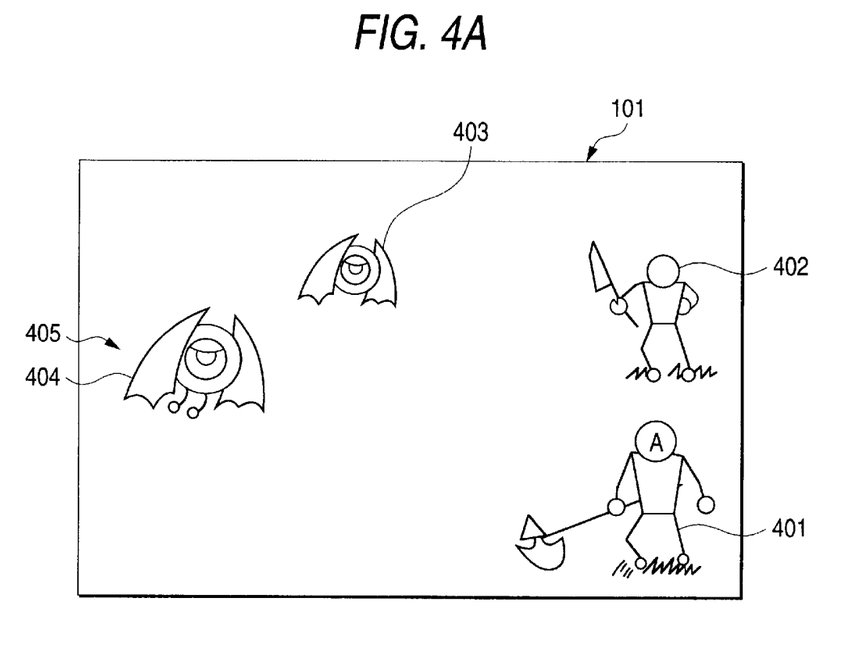
FIG. 4A is a view illustrating an example of a display picture of the invention.
Figure 4B:
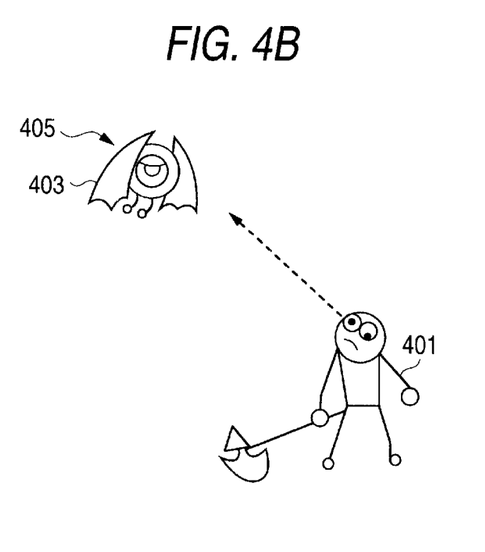
FIG. 4B is a view illustrating an exemplary part of a display of the invention.
Figure 4C:
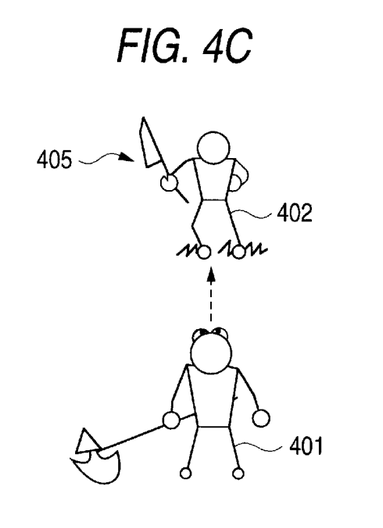
FIG. 4C is an exemplary view illustrating a part of the of the invention.

FIG. 3 is a flow chart showing an example of a processing procedure for the battle control operation input-acceptance processing (step S7) of the preferred embodiment described above. FIG. 4A shows an example of a specific display picture pertaining to battle control operation input-acceptance processing, and FIGS. 4B and 4C show parts of the same display picture. With reference to FIG. 3 and FIGS. 4A, 4B and 4C, battle control operation input-acceptance processing in the preferred embodiment described above will now be explained. The steps in FIG. 3 have been assigned the reference numerals S21 through S34.

In FIGS. 4A, 4B and 4C the reference number 401 denotes a player character taking part in a battle and the reference numbers 402 through 404 denote enemy characters, and it will be assumed that a battle can be fought with any combination of the player character 401 and the enemy characters 402 through 404.

First, when the battle control operation input-acceptance processing is reached in the routine of FIG. 2, in step S21, an initial battle picture is displayed, as shown in FIG. 4A. In this initial battle picture, the player character 401 and the enemy characters 402 through 404 are displayed confronting each other. In FIG. 4A, the reference number 405 denotes a cursor for pointing to a candidate character intended to be the object of an action; however, this cursor is not displayed at this stage.

In step S22 it is determined whether or not the L1-button 53 has been pressed, and when it is determined that the L1-button 53 has been pressed processing proceeds to step S23. When processing proceeds to step S23, a state is assumed wherein the player character 401 can be replaced with a substitute character. That is, a substitute character is selected by a control operation of the player, and character substitution processing is carried out as necessary between the selected substitute character and the player character 401. When the character substitution processing ends, processing returns to step S21 and the initial battle picture is displayed. And also when character substitution is canceled part-way through, processing returns to step S21 and the initial battle picture is displayed.

And when in step S22 it is determined that the L1-button 53 has not been pressed, processing moves on to step S24;

a state for accepting the input of an action (command input) to be executed by the player character 401 is assumed; and an action is selected in accordance with an operation of the +-key 51. In FIG. 4A, a display region for action selection is omitted. Then, in step S25, it is determined whether or not the O-button 52a has been pressed, and when it is determined that the O-button 52a has not been pressed processing returns to step S22 and the processing of step S22, step S24 and step S25 is repeated so that a standby state is assumed until either the L1-button 53 is pressed or the O-button 52a is pressed.

When in step S25 it is determined that the O-button 52a has been pressed, processing moves on to step S26; selection of the action selected at that time is confirmed, various associated processing is carried out, and the displayed picture changes to a battle execution picture. At this time, the cursor 405 of FIG. 4A is displayed for the first time, and a candidate character intended to be the object of an action determined by internal processing is indicated. When the various processing associated with action determination ends and the displayed picture changes to a battle execution picture, processing moves on to step S27.

When processing reaches step S27, a state for accepting the input of a candidate character intended to be the object of the action of the player character 401 is assumed; a candidate character is selected in accordance with a number of times the +-key 51 is pressed; and in step S28, the cursor 405 is controlled and displayed in accordance with the selection operation. In step S29, line of sight control of the player character 401 is implemented, and processing then proceeds to step S30.

In step S30, it is determined whether or not the O-button 52a has been pressed. When it is determined that the O-button 52a has not been pressed, processing proceeds to step S32 and it is determined whether or not the x-button 52b has been pressed. When it is determined that the x-button 52b has not been pressed, processing returns to step S27 and the processing of step S28 through step S33 is repeated so that a standby state, wherein candidate character selection input is accepted, is assumed until either the O-button 52a is pressed or the x-button 52b is pressed.

That is, each time the +-key 51 is pressed once, the cursor 405 moves from one displayed character to the next to indicate a selected candidate character, and the line of sight of the player character 401 is pointed at that candidate character.

For example, it is assumed that each time the +-key 51 is pressed once the cursor 405 moves around from character to character in the order 404→403→402→404 . . . . When from the initial state wherein the battle execution picture has been reached but the +-key has not been pressed the +-key is pressed once, as shown in FIG. 4B the cursor 405 moves to the enemy character 403 and the line of sight of the player character 401 (shown with a dashed arrow in the figure) is pointed to the enemy character 403. And when the +-key is pressed again, as shown in FIG. 4C the cursor 405 moves to the enemy character 402 and the line of sight of the player character 401 (shown with a dashed arrow in the figure) is pointed at the enemy character 402. Consequently, the player can easily make out the candidate character on the basis of the line of sight of the player character 401.

When the selection of a candidate character is input-accepted like this and then in step S32 it is determined that the O-button 52a has been pressed, the candidate character is confirmed as the object of the action and processing proceeds to step S31. When processing reaches step S31, distinguishing of the action to be performed by the player character 401 is carried out, and in step S33 control information for implementing predetermined line of sight control according to the distinguishing result is set.

When the setting of the control information is finished, processing proceeds to step S34 and the confirmed action is executed, and line of sight control is implemented between the player character 401 and the selected character. Consequently, one sequence of battle control operation input-acceptance processing ends with the lines of sight of the two characters still controlled to a predetermined relationship. When in step S32 it is determined that the x-button 52b has been pressed, processing returns to step S21 and the initial battle picture is displayed again.

The control of the lines of sight of the characters is now explained. For each character, there are prepared multiple images of which the body of the character faces a different way, and there are also prepared multiple images which the body faces the same way, but the face of the character faces a different way. Then, in line of sight control on selection of a candidate character, a direction is detected on the basis of the position information for each of the player character 401 and the enemy characters 402 through 404, and by a certain image of the player character 401 being displayed in accordance with that direction, its line of sight is controlled to the direction of the candidate character.

In line of sight control on action execution, a direction is detected successively on the basis of position information of the player character 401 arising from internal processing and position information of the character to be the object of the action. By the player character 401 and a certain image of the character to be the object of the action being displayed in accordance with the direction and the action, the directions of the lines of sight of the two are controlled to a predetermined relationship.

For example, when there are multiple player characters and a defense action such as 'magic' (command name) is to be executed with respect to a supporting character, the lines of sight are controlled so that the side using the 'magic' faces in the direction of the position of the opposing supporting character and then the supporting character on which the 'magic' has been used faces in the direction of the position of the player character which used the 'magic'. Conversely, when a character has 'magic' used on it by an opposing supporting character, from when the 'magic' is used, the line of sight of the character is controlled so as to point in the direction of the position of the opposing supporting character. And when a player character executes an attack action such as 'fight' (command name) with respect to an enemy character, the lines of sight of the attacking side and the side being attacked are both held so that they point at each other. Consequently, players can, to some extent, understand the state of execution of an action from the lines of sight of the two characters involved. When 'magic' is used on all of a number of enemies (or supporters), by the line of sight of the supporting (or enemy) character using the 'magic' being made to face the front, the situation can be understood more easily.

Thus, the preferred embodiment described above provides the following effects. A first effect is that because the line of sight of a predetermined character about to execute an action is controlled so that it points at a candidate character, the player can easily understand which is the candidate character, and the enjoyability of the game can be maintained. A second effect is that because a predetermined input-accepted action is executed the line of sight of the predetermined character performing the action and the line of sight of the candidate character are controlled so that they assume a predetermined relationship. The relationship between the predetermined character and the candidate character can then, to some extent, be understood and the enjoyability of the game can be better maintained.

Next, other preferred embodiments will be described. In the preferred embodiment described above, in the battle control input-acceptance processing, a case wherein control commands relating to battle control operations are accepted using the L1-button 53, the +-key 51, the O-button 52a and the x-button 52b was described; however, other buttons may alternatively be used. And whereas a case was described in which only the timing at which a switch is turned on after its respective button is pressed is monitored in the input-accepting of operation commands, alternatively operation commands may be accepted using the timing at which the switch linked to the respective button is turned off, or both the on and the off timing of the switch linked to a respective button can be monitored and both combined to input-accept operation commands. Also, the time for which a switch linked to a respective button is on or off can be combined to input-accept operation commands.

In the preferred embodiment described above, a case is described wherein the line of sight of a predetermined character about to execute an action is controlled so as to point to a candidate character. Also, in the execution of a predetermined action, the line of sight of the predetermined character performing the action and the line of sight of the candidate character are controlled so as to assume a predetermined relationship, also, between the position of the character whose line of sight has been directed and the position of a character at which the line of sight is directed. A display which associates the relationship of the two may be carried out in the representation of the background of the characters. However, the effects of the invention can be obtained by controlling the line of sight of the predetermined character performing the action and the line of sight of the candidate character so that they assume a predetermined relationship.

The present invention is not limited to the preferred embodiments described above, and it will be clear that various changes and modifications are possible within the spirit and scope of the invention. For example, the order of the steps of a method according to the invention can be changed within the spirit and scope of the invention.

As described above, with the present invention it is possible to exploit the particular characteristics of the video game to raise its sense of reality and it is possible to understand easily which character is to be the object of an action of a player character and to maintain the enjoyability of the game.

What is claimed is:

1. A computer-readable recording medium on which is recorded a video game program capable of displaying multiple display characters and controlling actions of the displayed characters in accordance with control operations of a player, which program executes:

accepting an input to a computer to select a candidate character to be an object of an action to be performed by a predetermined character in accordance with a control operation of a player; and performing image-control so that a line of sight of the predetermined character points to the candidate character selected by the input.

2. The computer-readable recording medium according to claim 1, the program further executing:

accepting input of an action to be performed by the predetermined character in accordance with a control operation of a player;

distinguishing the action accepted as input when accepting the input; and executing the action accepted as input when accepting the input in accordance with a control operation of the player and performing image-control in accordance with a distinguishing result obtained when distinguishing the action so that the line of sight of the predetermined character and a line of sight of the candidate character assume a predetermined relationship.

3. A computer-readable recording medium on which is recorded a video game program capable of displaying multiple display characters and controlling actions of the displayed characters in accordance with control operations of a player, which program executes:

accepting an input to a computer of an action to be performed by a predetermined character in accordance with a control operation of a player;

distinguishing the input as an action when accepting the input; and executing the action and performing image-control in accordance with a distinguishing result obtained when distinguishing the action so that a line of sight of the predetermined character and a line of sight of a character to be the object of the action assume a predetermined relationship.

4. A video game program capable of displaying multiple display characters and controlling actions of the displayed characters in accordance with control operations of a player, which program executes:

accepting a first input to a computer to select a candidate character to be an object of a first action to be performed by a predetermined character in accordance with a control operation of a player; and performing image-control so that a line of sight of the predetermined character points to the candidate character as selected by the first input.

5. The video game program according to claim 4, further executing:

accepting a second input of a second action to be performed by the predetermined character in accordance with a control operation of a player;

distinguishing the second action accepted as the second input when accepting the second input; and executing the second action accepted as the second input in accordance with a control operation of the player and performing image-control in accordance with a distinguishing result obtained when distinguishing the second action so that the line of sight of the predetermined character and a line of sight of the candidate character assume a predetermined relationship.

6. A video game program capable of displaying multiple display characters and controlling actions of the displayed characters in accordance with control operations of a player, which program executes:

accepting an input to a computer of an action to be performed by a predetermined character in accordance with a control operation of a player;

distinguishing the input as an action when accepting the input; and executing the action and performing image-control in accordance with a distinguishing result obtained when distinguishing the action so that a line of sight of the predetermined character and a line of sight of a character to be the object of the action assume a predetermined relationship.

7. A video game processing method of a video game capable of displaying multiple display characters and controlling actions of the displayed characters in accordance with control operations of a player, the method comprising:

accepting a first input to a computer to select a candidate character be the object of a first action to be performed by a predetermined character in accordance with a control operation of a player; and performing image-control so that a line of sight of the predetermined character points to the candidate character selected by the first input.

8. The video game processing method according to claim 7, further comprising:

accepting a second input of a second action to be performed by the predetermined character in accordance with a control operation of a player;

distinguishing the second action accepted as the second input when accepting the second input; and executing the second action accepted as the second input when accepting the second action in accordance with a control operation of the player and performing image-control in accordance with a distinguishing result obtained when distinguishing the second action so that the line of sight of the predetermined character and a line of sight of the candidate character assume a predetermined relationship.

9. A video game processing method of a video game capable of displaying multiple display characters and controlling actions of the displayed characters in accordance with control operations of a player, the method comprising:

accepting an input to a computer of an action to be performed by a predetermined character in accordance with a control operation of a player;

distinguishing the action input as an action when accepting the input; and executing the action and performing image-control in accordance with a distinguishing result obtained when distinguishing the action so that a line of sight of the predetermined character and a line of sight of a character to be the object of the action assume a predetermined relationship.

10. A video game processing apparatus, comprising: a storage that stores a video game program capable of displaying multiple display characters and controlling actions of the displayed characters in accordance with control operations of a player;

a computer that reads from the storage and executes a program; and a display that displays an image, wherein the computer, by executing the program, accepts a first input to select a candidate character to be the object of a first action to be performed by a predetermined character in accordance with a control operation of a player, and performs image-control so that a line of sight of the predetermined character points to the candidate character accepted as the first input.

11. The video game processing apparatus according to claim 10, wherein the computer also accepts a second input of a second action to be performed by the predetermined character in accordance with a control operation of a player and distinguishes the second action accepted as the second input and executes the second action accepted as the second input in accordance with a control operation of the player and performs image-control in accordance with a result of distinguishing the second action accepted as the second input so that the line of sight of the predetermined character and the-a line of sight of the candidate character assume a predetermined relationship.

12. A video game processing apparatus, comprising:

a storage that stores a video game program capable of displaying multiple display characters and controlling actions of the displayed characters in accordance with control operations of a player;

a computer that reads from the storage and executes a program; and a display that displays an image, wherein the computer, by executing the program, accepts the input of an action to be performed by a predetermined character in accordance with a control operation of a player, distinguishes the accepted input as an action, executes the action in accordance with a control operation of the player and performs image-control in accordance with a result of distinguishing the action accepted as input so that a line of sight of the predetermined character and a line of sight of the character to be the object of the action assume a predetermined relationship.

* * * * *

UNITED STATES PATENT AND TRADEMARK OFFICE
CERTIFICATE OF CORRECTION

PATENT NO. : 6,672,964 B2
DATED : January 6, 2004
INVENTOR(S) : M. Kobayashi

It is certified that error appears in the above-identified patent and that said Letters Patent is hereby corrected as shown below:

Column 15,
Line 9, after "character" insert -- to --.

Column 16,
Line 25, "the-a" should be -- a --.

Signed and Sealed this

Seventh Day of September, 2004

JON W. DUDAS
*Director of the United States Patent and Trademark Office*